United States Patent
Suehiro et al.

(10) Patent No.: US 8,777,468 B2
(45) Date of Patent: Jul. 15, 2014

(54) FOG LAMP COVER MOUNTING STRUCTURE

(75) Inventors: Hitoshi Suehiro, Nisshin (JP); Akihiro Hirose, Kiyosu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 321 days.

(21) Appl. No.: 13/288,139

(22) Filed: Nov. 3, 2011

(65) Prior Publication Data
US 2012/0113669 A1 May 10, 2012

(30) Foreign Application Priority Data

Nov. 10, 2010 (JP) .................................. 2010-251786

(51) Int. Cl.
*B60Q 1/00* (2006.01)
(52) U.S. Cl.
USPC ........................................................ 362/505
(58) Field of Classification Search
USPC .................... 362/505, 506, 507, 549
See application file for complete search history.

(56) References Cited

U.S. PATENT DOCUMENTS

| | | | | | |
|---|---|---|---|---|---|
| 4,466,646 | A | * | 8/1984 | Delmastro et al. | 293/117 |
| 6,361,197 | B1 | * | 3/2002 | Katsumata et al. | 362/546 |
| 7,534,021 | B2 | * | 5/2009 | Naik et al. | 362/549 |
| 2010/0032971 | A1 | * | 2/2010 | Stoffel et al. | 293/155 |

FOREIGN PATENT DOCUMENTS

| | | |
|---|---|---|
| JP | 2006-193008 | 7/2006 |
| JP | 2009-006900 | 1/2009 |

* cited by examiner

*Primary Examiner* — Julie Bannan
(74) *Attorney, Agent, or Firm* — Finnegan, Henderson, Farabow, Garrett & Dunner, LLP (57) ABSTRACT

A fog lamp cover mounting structure includes: a cover body that is assembled to a mounting portion at which a fog lamp is mounted on a bumper, that has an opening through which the fog lamp appears, and that has a first engaging portion that engages with the bumper; and a cover ring that is assembled to a peripheral portion of the opening of the cover body, and that has a second engaging portion that engages with the first engaging portion.

12 Claims, 6 Drawing Sheets

FOG LAMP COVER MOUNTING STRUCTURE

INCORPORATION BY REFERENCE

The disclosure of Japanese Patent Application No. 2010-251786 filed on Nov. 10, 2010 including the specification, drawings and abstract is incorporated herein by reference in its entirety.

BACKGROUND OF THE INVENTION

1. Field of the Invention

The invention relates to a fog lamp cover mounting structure.

2. Description of Related Art

Japanese Patent Application Publication No. 2006-193008 (JP-A-2006-193008) describes a fog lamp finisher structure that includes a fog lamp finisher body (cover body) having a lamp opening through which a fog lamp appears and attached to a bumper by hooks and a ring member (cover ring) that is arranged at the peripheral portion of the lamp opening. In the fog lamp finisher structure, the fog lamp finisher body and the ring member are coupled to each other by fitting hooks.

However, in the above described related art, these hooks cannot be arranged at positions at which hooks for assembling the cover ring to the cover body interfere with the hooks for assembling the cover body to the bumper.

SUMMARY OF THE INVENTION

The invention provides a fog lamp cover mounting structure that forms a fog lamp cover of two components, that is, a cover body and a cover ring, and that allows assembling the cover ring to the cover body and assembling the cover body to a bumper within a limited space.

An aspect of the invention relates to a fog lamp cover mounting structure. The fog lamp cover mounting structure includes: a cover body that is assembled to a mounting portion at which a fog lamp is mounted on a bumper, that has an opening through which the fog lamp appears, and that has a first engaging portion that engages with the bumper; and a cover ring that is assembled to a peripheral portion of the opening of the cover body, and that has a second engaging portion that engages with the first engaging portion.

With the fog lamp cover mounting structure according to the above aspect, when the cover ring is assembled to the cover body, the second engaging portion engages with the first engaging portion of the cover body. The first engaging portion engages with the bumper when the cover body is assembled to the bumper. In this way, the second engaging portion of the cover ring is engaged with the first engaging portion of the cover body to form the fog lamp cover of two components, that is, the cover body and the cover ring, while making it possible to achieve both assembling the cover ring to the cover body in a limited space and assembling the cover body to the bumper.

In the fog lamp cover mounting structure according to the above aspect, a direction in which the first engaging portion deforms at the time when the cover body is assembled to the bumper may be set in a direction to enhance engagement between the first engaging portion and the Second engaging portion.

With the fog lamp cover mounting structure according to the above aspect, when the cover body is assembled to the bumper, the first engaging portion deforms in a direction to enhance engagement between the first engaging portion and the second engaging portion, so, when the cover ring is assembled to the cover body in advance to form the fog lamp cover and then the fog lamp cover is assembled to the bumper, disengagement of the cover ring from the cover body is prevented. Therefore, it is possible to improve workability for assembling the fog lamp cover.

In the fog lamp cover mounting structure according to the above aspect, the first engaging portion and the second engaging portion each may have a hook that is formed to protrude in a direction away from a center of the opening, and the first engaging portion may have an engaging hole that extends therethrough and that engages with the hook of the second engaging portion.

When the cover body is molded, a slide core is arranged on the outer side of the first engaging portion. The slide core recedes in a direction away from the center of the opening when a die is released after molding the cover body. With the fog lamp cover mounting structure according to the above aspect, the first engaging portion and the second engaging portion each have a hook that is formed to protrude in a direction away from the center of the opening of the cover body, and the first engaging portion has an engaging hole that extends therethrough and that engages with the hook of the second engaging portion, so the hook and the engaging hole may be formed in the first engaging portion without increasing the number of the slide cores. By so doing, it is possible to suppress an increase in manufacturing cost.

In the fog lamp cover mounting structure according to the above aspect, any one of the cover body and the cover ring may have an engaging guide portion that guides engagement between the first engaging portion and the second engaging portion.

With the fog lamp cover mounting structure according to the above aspect, when the cover ring is assembled to the cover body, the engaging guide portion is used to guide engagement between the first engaging portion and the second engaging portion. Therefore, the cover ring may be smoothly assembled to the cover body.

In the fog lamp cover mounting structure according to the above aspect, the cover ring may have a plurality of engaging portions, including the second engaging portion, that engage with the cover body, and the second engaging portion may be the engaging portion located at an outermost side in a vehicle widthwise direction among the plurality of engaging portions.

When the cover ring is intended to be located adjacent to the outer side in the vehicle widthwise direction, a space for providing the first engaging portion and the second engaging portion is further limited. With the fog, lamp cover mounting structure according to the above aspect, the second engaging portion that engages with the first engaging portion is the engaging portion located at the outermost side in the vehicle widthwise direction among the plurality of engaging portions of the cover ring, so the first engaging portion and the second engaging portion may be arranged in a limited space, and the cover ring may be located further adjacent to the outer side in the vehicle widthwise direction. Therefore, the flexibility of design may be improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
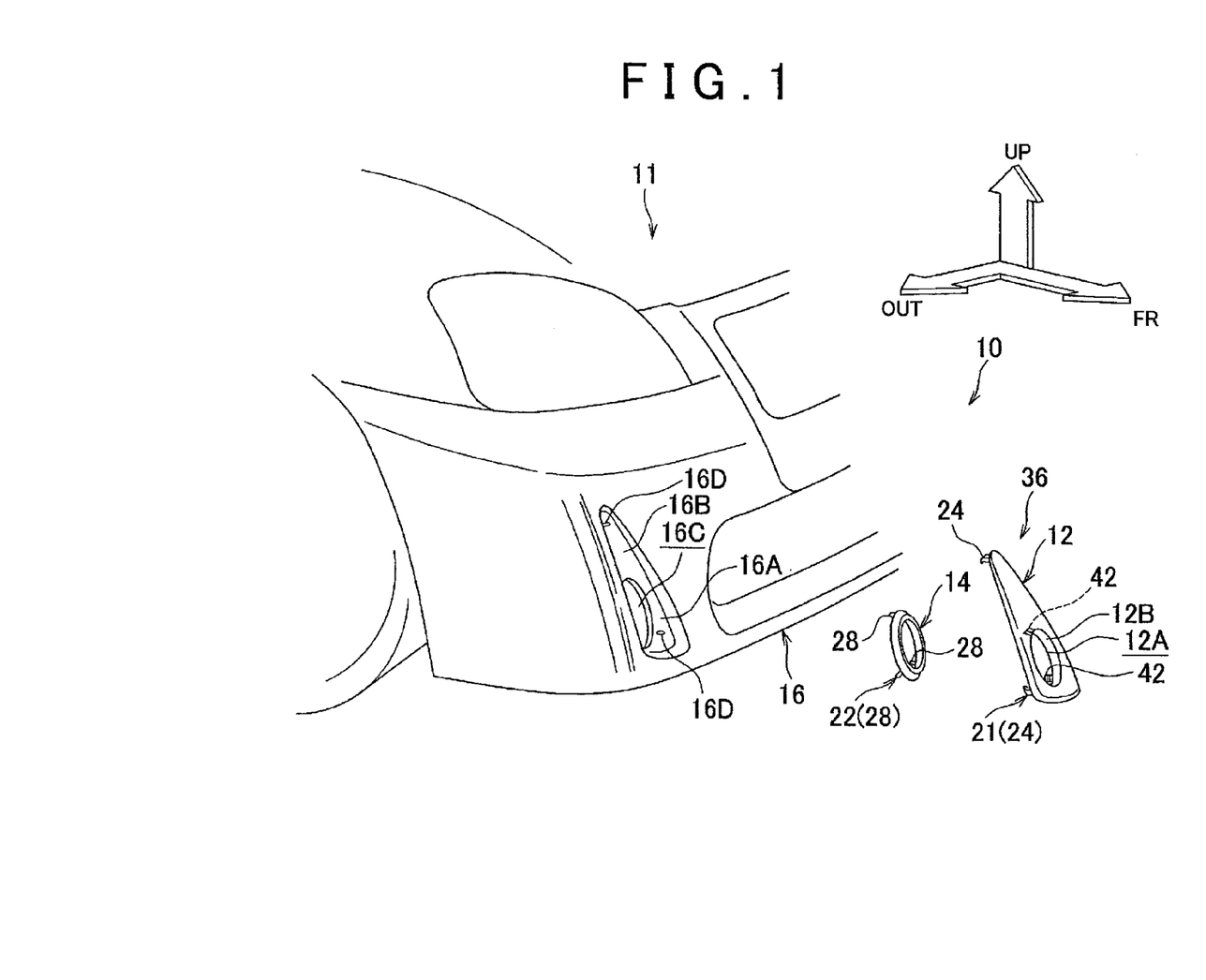
FIG. 1 is an exploded perspective view that shows a fog lamp cover mounting structure.

Hereinafter, an embodiment of the invention will be described with reference to the accompanying drawings. As shown in FIG. 1, a fog lamp cover mounting structure 10 according to the present embodiment includes a cover body 12 and a cover ring 14.

Figure 2:
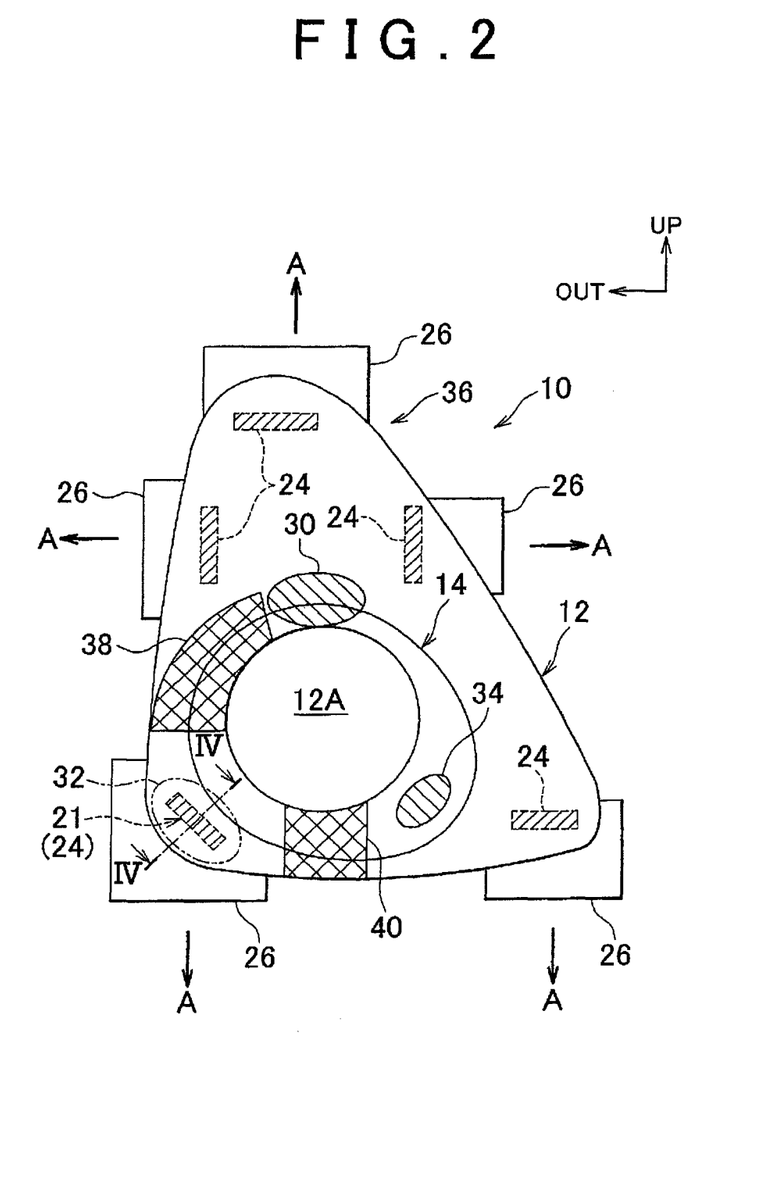
FIG. 2 is a front view that shows the fog lamp cover mounting structure.
Figure 3:
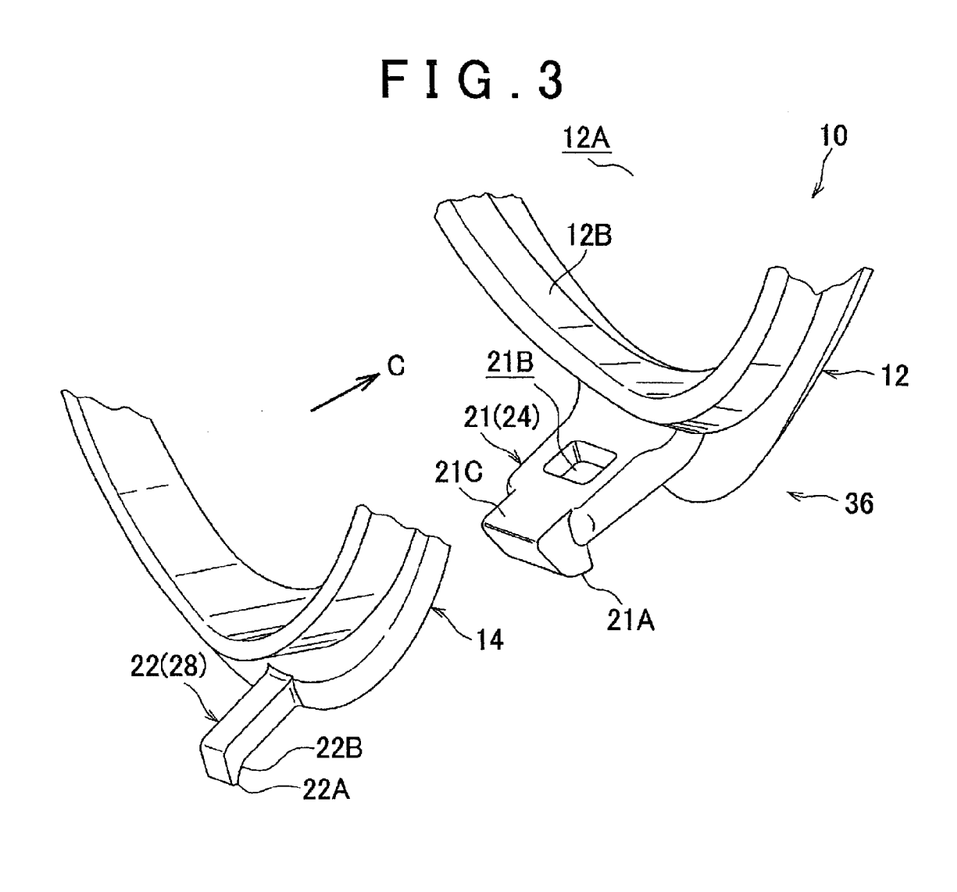
FIG. 3 is an exploded perspective view of a relevant portion, showing a cover body and a cover ring.
Figure 4:
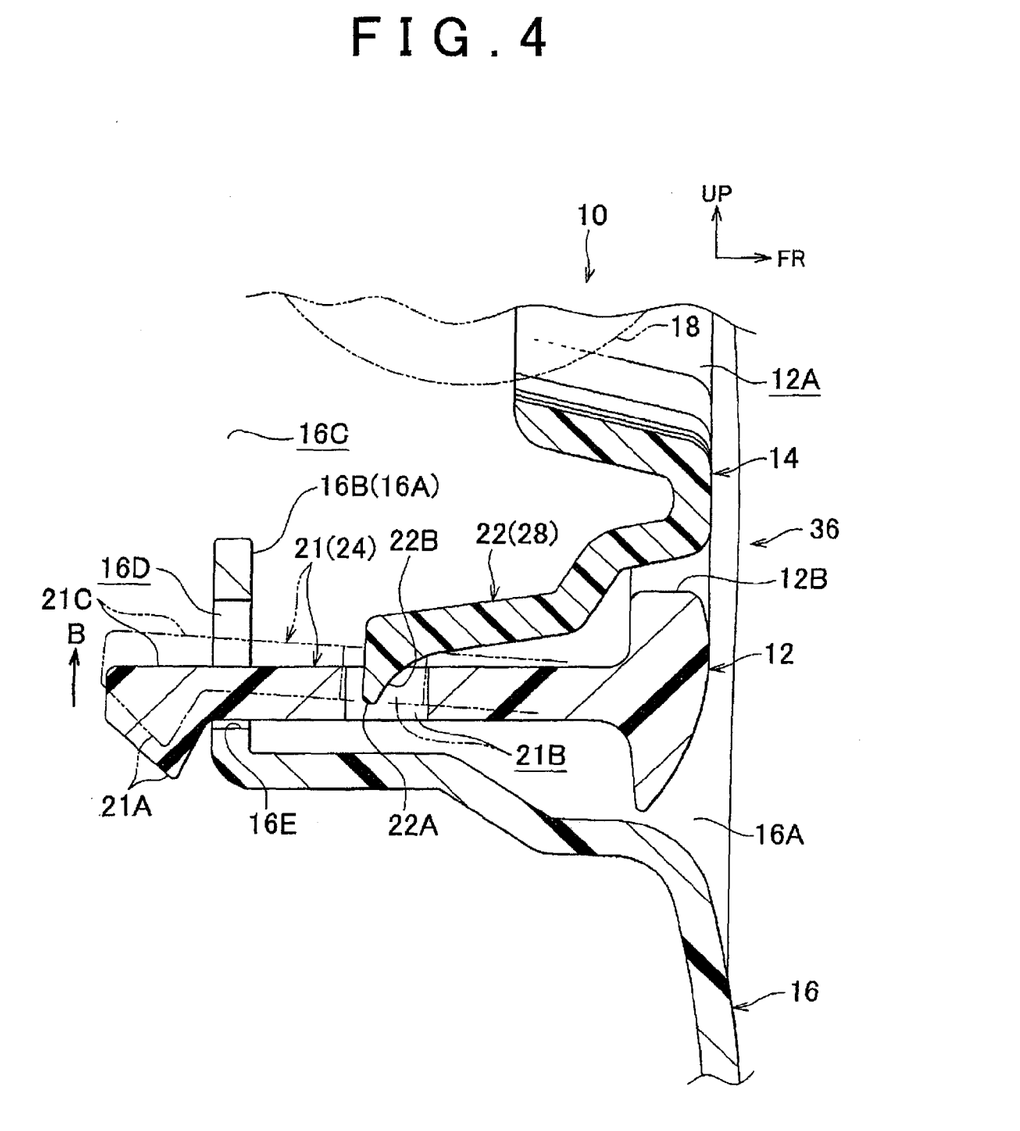
FIG. 4 is an enlarged cross-sectional view of the fog lamp cover mounting structure, taken along the line IV-IV in FIG. 2.

As shown in FIG. 1 and FIG. 2, the cover body 12 is assembled to a mounting portion 16A at which a fog lamp 18 (FIG. 4) is mounted on a bumper 16. The cover body 12 has an opening 12A through which the fog lamp 18 appears, and has a first engaging portion 21 that engages with the bumper 16. As shown in FIG. 3 and FIG. 4, the first engaging portion 21 has a hook 21A. The hook 21A is formed to protrude in a direction away from the center of the opening 12A of the cover body 12.

As shown in FIG. 1, the bumper 16 is, for example, a bumper cover made of synthetic resin, and is assembled to the front side of a vehicle 11. The mounting portion 16A at which the fog lamp 18 (FIG. 4) is mounted on the bumper 16 has a recess 16B. The recess 16B corresponds to the shape of the cover body 12. For example, the cover body 12 is fitted to the recess 16B. The recess 16B has, for example, a substantially circular through-hole 16C and an engaging portion 16D. The through-hole 16C is, for example, used to arrange the fog lamp 18. The engaging portion 16D engages with the first engaging portion 21 of the cover body 12. As shown in FIG. 4, the engaging portion 16D is, for example, formed as a through-hole. When the first engaging portion 21 is inserted in the engaging portion 16D, the first engaging portion 21 engages with the peripheral portion 16E of the engaging portion 16D. Note that the engaging portion 16D is not limited to the through-hole; the engaging portion 16D may have any structure as long as it has a shape that is engageable with the first engaging portion 21.

The cover body 12 shown in FIG. 2 is a synthetic resin molded product formed in, for example, a substantially triangular shape in vehicle front view, and is assembled to a vehicle right side. For example, five engaging portions 24 that engage with the bumper 16 (FIG. 1) are provided on the back surface side of the cover body 12 so as to protrude toward a vehicle rear side. The engaging portions 24 include the first engaging portion 21.

The three engaging portions 24 are respectively provided, for example, one by one near three vertices of the cover body 12. The first engaging portion 21 is the one located at the outermost side in the vehicle widthwise direction and the vehicle lower side, that is, the vehicle lower right, among the three engaging portions 24. The other two engaging portions 24 are provided in a relatively wide area located at the vehicle upper side of the opening 12A in the cover body 12 so as to be spaced apart from each other in the vehicle widthwise direction. Note that, for the cover body 12 assembled to the vehicle left side, the first engaging portion 21 is arranged at the vehicle lower left conversely (not shown).

As shown in FIG. 2, when the cover body 12 is molded, slide cores 26 are used to form the engaging portions 24 so as to protrude from the back surface side of the cover body 12. The slide core 26 is arranged one by one on the outer side of each engaging portion 24 as viewed from the center of the opening 12A. A die (not shown) is positioned on the inner side of each engaging portion 24 to form a cavity (not shown) corresponding to each engaging portion 24 between the pair of die and slide core. Each slide core 26 is configured to be able to recede in a direction away from the center of the opening 12A (arrow A direction) when the die is released after molding the cover body 12.

As shown in FIG. 1 to FIG. 4, the cover ring 14 is assembled to the peripheral portion 12B of the opening 12A of the cover body 12, and has a second engaging portion 22 that engages with the first engaging portion 21. The cover ring 14 is a synthetic resin molded product that is formed in, for example, an annular shape in vehicle front view. In addition, the cover ring 14 has a plurality of engaging portions 28, including the second engaging portion 22, that engage with the cover body 12. Specifically, for example, the three engaging portions 28 are formed on the back surface side of the cover ring 14 so as to protrude toward the vehicle rear side.

As shown in FIG. 2, an area 38 is located at the outer side in the vehicle widthwise direction and placed between the upper and lower slide cores 26 (located in the range from the right periphery to upper right periphery of the cover ring 14) in the peripheral portion of the opening 12A. In addition, an area 40 is located at the vehicle lower side and placed between the right and left slide cores 26 (located at the lower periphery of the cover ring 14) in the peripheral portion of the opening 12A.

The area 38 has no gap from the fog lamp 18 (FIG. 4), and the area 40 is close to the slide core 26, so the engaging portion 28 cannot be provided in the area 38 or the area 40. Thus, the engaging portion 28 is, for example, provided one by one in areas 30, 32 and 34 other than the areas 38 and 40. The area 30 is located at the upper periphery of the cover ring 14. The area 32 is located at the vehicle lower right of the cover ring 14. Then, the area 34 is located at the lower left of the cover ring 14. As shown in FIG. 1, the cover body 12 has, for example, engaging portions 42 with which the engaging portions 28 engage in correspondence with the areas 30 and 34 (FIG. 2). Each engaging portion 42 may have any configuration as long as it is engageable with the corresponding engaging portion 28.

The second engaging portion 22 is the one located in the area 32 (FIG. 2) at the outermost side in the vehicle widthwise direction among the three engaging portions 28. The cover body 12 has the above described first engaging portion 21, with which the second engaging portion 22 engages, in correspondence with the area 32.

As shown in FIG. 3 and FIG. 4, the second engaging portion 22 has a hook 22A. The hook 22A is formed to protrude in a direction away from the center of the opening 12A of the cover body 12. Here, the "direction away from the center of the opening 12A of the cover body 12" is not defined by the cover ring 14 alone; as shown in FIG. 4, it is defined in a state where the cover ring 14 is assembled to the cover body 12.

The first engaging portion 21 has an engaging hole 21B that engages with the hook 22A of the second engaging portion 22. The cover ring 14 is assembled to the cover body 12, for example, from the vehicle rear side toward the vehicle front side. At this time, the hook 22A of the second engaging portion 22 engages with the engaging hole 21B of the first engaging portion 21. By so doing, a fog lamp cover 36 is formed.

Note that the surface of the hook 22A on the vehicle front side is formed as an inclined surface 22B that is an example of an engaging guide portion so as to be able to smoothly assemble the cover ring 14 to the cover body 12 from the vehicle rear side. The engaging guide portion is provided for any one of the cover body 12 and the cover ring 14, and guides engagement between the first engaging portion 21 and the second engaging portion 22. In the present embodiment, the inclined surface 22B that is an example of the engaging guide portion is provided for the cover ring 14.

The direction in which the first engaging portion 21 deforms at the time when the cover body 12 is assembled to the bumper 16 is set in a direction to enhance engagement between the first engaging portion 21 and the second engaging portion 22. Specifically, as shown in FIG. 4, the hook 21A of the first engaging portion 21 is formed to protrude in a direction away from the center of the opening 12A of the cover body 12, and the hook 22A of the second engaging portion 22, as well as the hook 21A, is formed to protrude in a direction away from the center of the opening 12A of the cover body 12. By so doing, at the time of assembling the cover body 12 to the bumper 16, when the hook 21A slides over the peripheral portion 16E of the engaging portion 16D of the bumper 16, the first engaging portion 21 deforms toward the center of the opening 12A, and the hook 22A relatively enters deeper in the engaging hole 21B of the first engaging portion 21.

The present embodiment is configured as described above, and the function thereof will be described below. As shown in FIG. 2, when the cover body 12 is molded, the slide core 26 is arranged on the outer side of the first engaging portion 21. The slide core 26 recedes in a direction away from the center of the opening 12A when the die is released after molding the cover body 12. In the present embodiment, as shown in FIG. 3, the first engaging portion 21 and the second engaging portion 22 respectively have the hooks 21A and 22A that are formed to protrude in a direction away from the center of the opening 12A of the cover body 12, and the first engaging portion 21 has the engaging hole 21B that engages with the hook 22A of the second engaging portion 22 and that penetrates the first engaging portion 21, so the hook 21A and the engaging hole 2113 may be formed in the first engaging portion 21 without increasing the number of the slide cores 26. By so doing, it is possible to suppress an increase in manufacturing cost.

When the fog lamp cover is formed of two components, that is, the cover body 12 and the cover ring 14, the engaging portions 28 for assembling the cover ring 14 to the cover body 12 are, required.

On the other hand, when the flexibility of design and irradiation range are taken into consideration for the fog lamp 18 (FIG. 4) provided for the bumper 16, the fog lamp 18 is desirably arranged adjacent to the outer side of the bumper 16 in the vehicle widthwise direction as much as possible. However, when the cover ring 14 is attempted to be arranged adjacent to the outer side in the vehicle widthwise direction with respect to the cover body 12, a space for providing the first engaging portion 21 and the second engaging portion 22 is further limited at the outer side of the cover ring 14.

Then, in the fog lamp cover mounting structure 10 according to the present embodiment, when the cover ring 14 is assembled to the cover body 12, the second engaging portion 22 engages with the first engaging portion 21 of the cover body 12 to thereby achieve both assembling of the cover ring 14 to the cover body 12 in a limited space and assembling of the cover body 12 to the bumper 16.

As shown in FIG. 3, the cover ring 14 is assembled to the cover body 12 in the arrow C direction, for example, from the vehicle rear side toward the vehicle front side. At this time, the hook 22A of the second engaging portion 22 engages with the engaging hole 21B of the first engaging portion 21; however, the surface of the hook 22A on the vehicle front side is the inclined surface 22B, so the hook 22A is able to smoothly slide onto the inner surface 21C of the first engaging portion 21. At this time, the first engaging portion 21 and the second engaging portion 22 elastically deform where appropriate. The hook 22A slides over the inner surface 21C and then enters the engaging hole 21B to engage with the engaging hole 21B. Therefore, the cover ring 14 may be smoothly assembled to the cover body 12. Although not shown in the drawing, the engaging portions 28 of the cover ring 14, other than the second engaging portion 22, respectively engage with the engaging portions 24 of the cover body 12, other than the first engaging portion 21. When the cover ring 14 is assembled to the cover body 12 in this way, the fog lamp cover 36 is formed.

When the cover body 12 (fog lamp cover 36) to which the cover ring 14 is assembled in advance is assembled to the bumper 16, the first engaging portion 21 engages with the engaging portion 16D of the bumper 16. At this time, the first engaging portion 21 deforms in a direction to enhance engagement between the first engaging portion 21 and the second engaging portion 22. Specifically, as shown in FIG. 4, the hook 21A of the first engaging portion 21 is formed to protrude in a direction away from the center of the opening 12A of the cover body 12, so the hook 21A needs to slide over the peripheral portion 16E of the through-hole in order for the first engaging portion 21 to engage with the through-hole, that is, the engaging portion 16D of the bumper 16. At this time, as indicated by the alternate long and two short dashes line, the first engaging portion 21 elastically deforms toward the center of the opening 12A (in the allow B direction).

On the other hand, the hook 22A of the second engaging portion 22, as well as the hook 21A, is also formed to protrude in a direction away from the center of the opening 12A of the cover body 12, and engages with the engaging hole 21B of the first engaging portion 21 from the inner side. Thus, when the first engaging portion 21 elastically deforms in the arrow B direction, the hook 22A of the second engaging portion 22 relatively enters deeper in the engaging hole 21B of the first engaging portion 21. As the hook 21A slides over the peripheral portion 16E, the first engaging portion 21 returns to the state shown by the solid line, and the first engaging portion 21 is engaged with the bumper 16. In addition, at this time, engagement between the second engaging portion 22 and the first engaging portion 21 is also continuously maintained.

Thus, when the cover ring 14 is assembled to the cover body 12 in advance to form the fog lamp cover 36 and then the fog lamp cover 36 is assembled to the bumper 16, disengagement of the cover ring 14 from the cover body 12 is prevented. Therefore, it is possible to improve workability for assembling the fog lamp cover 36.

In the present embodiment, as described above, the second engaging portion 22 of the cover ring 14 is engaged with the first engaging portion 21 of the cover body 12 to form the fog lamp cover 36 of two components, that is, the cover body 12 and the cover ring 14, while making it possible to achieve both assembling the cover ring 14 to the cover body 12 and assembling the cover body 12 to the bumper 16 in a limited space.

In addition, in the present embodiment, the second engaging portion 22 is the one located at the outermost side in the vehicle widthwise direction among the plurality of engaging portions 28 of the cover ring 14, so the first engaging portion 21 and the second engaging portion 22 may be arranged in a limited space, and the cover ring 14 may be located further adjacent to the outer side in the vehicle widthwise direction. By so doing, the fog lamp 18 (FIG. 4) may be located further adjacent to the outer side in the vehicle widthwise direction, so the flexibility of design may be improved, and the irradiation range of the fog lamp 18 may be expanded laterally.

In the above described embodiment, the second engaging portion 22 has the hook 22A that is formed to protrude in a direction away from the center of the opening 12A of the cover body 12, and the hook 22A engages with the engaging hole 21I3 of the first engaging portion 21; however, the structure for engaging the first engaging portion 21 with the second engaging portion 22 is not limited to this configuration. Instead, the structure for engaging the first engaging portion 21 with the second engaging portion 22 may be configured as an alternative embodiment shown in FIG. 5 and FIG. 6. A hook 21D is provided on the inner surface 21C of the first engaging portion 21 according to the alternative embodiment. The hook 21D is formed to protrude in a direction approaching the center of the opening 12A. On the other hand, the second engaging portion 22 has an engaging hole 22C that is formed to extend therethrough. The engaging hole 22C engages with the hook 21D of the first engaging portion 21. The cover ring 14 is assembled to the cover body 12, for example, from the vehicle rear side toward the vehicle front side. At this time, the hook 21D of the first engaging portion 21 engages with the engaging hole 22C of the second engaging portion 22. By so doing, the fog lamp cover 36 is formed.

Figure 5:
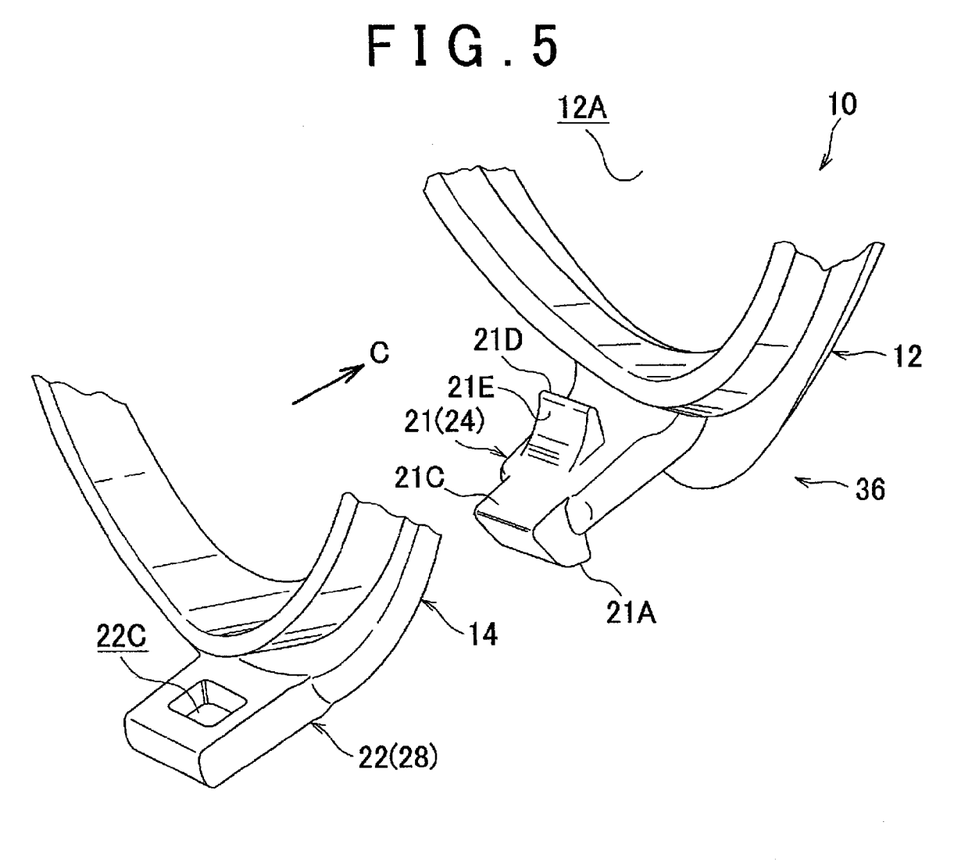
FIG. 5 is an exploded perspective view of a relevant portion, showing a cover body and a cover ring according to an alternative embodiment.
Figure 6:
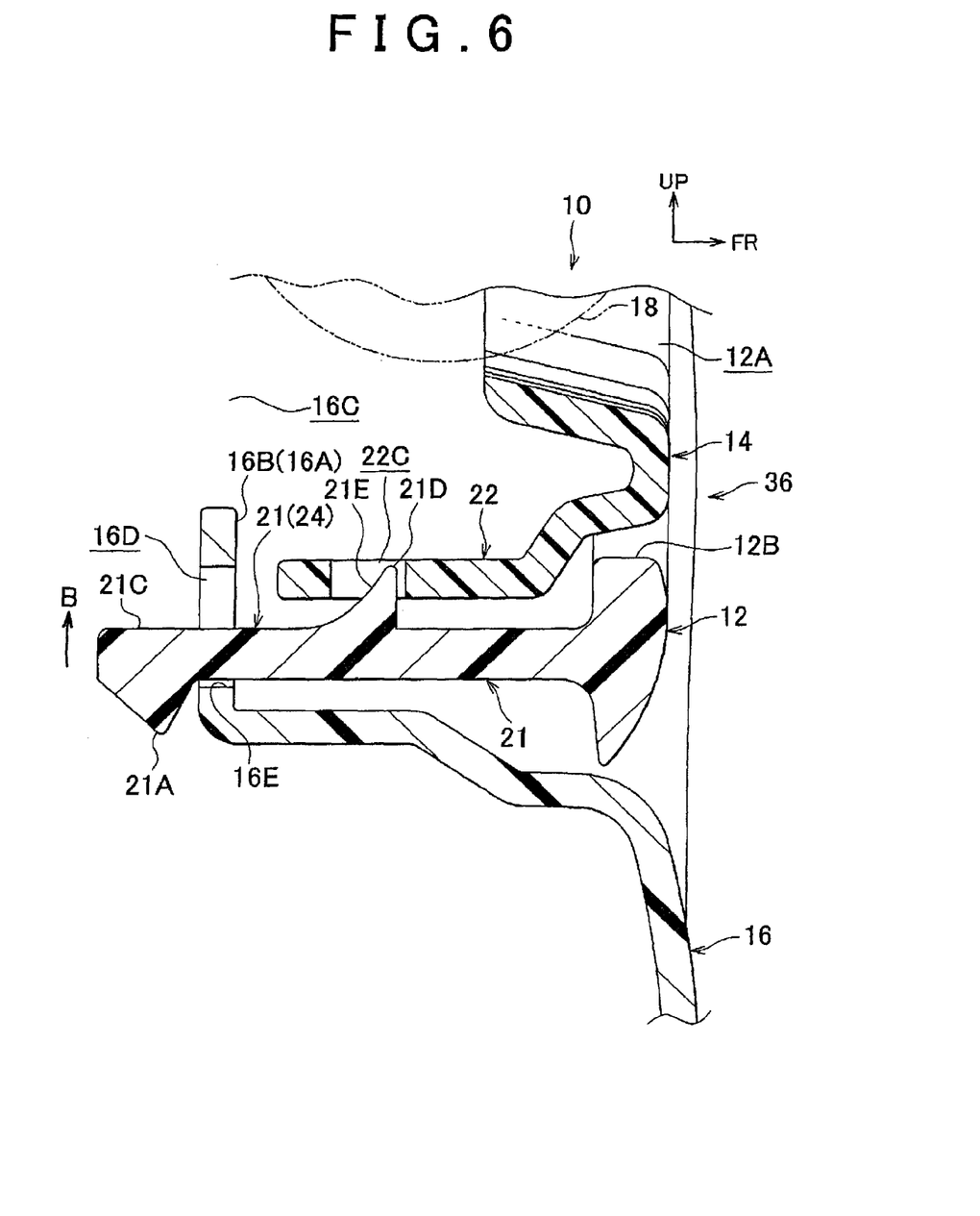
FIG. 6 is an enlarged cross-sectional view of a fog lamp cover mounting structure, corresponding to FIG. 4, according to the alternative embodiment.

Note that the surface of the hook 21D on the vehicle rear side is formed as an inclined surface 21E that is an example of the engaging guide portion in order for the cover ring 14 to be able to be smoothly assembled to the cover body 12 from the vehicle rear side. In the present embodiment, the inclined surface 21E that is an example of the engaging guide portion is provided for the cover body 12. Owing to the inclined surface 21E, the cover ring 14 may be smoothly assembled to the cover body 12.

As shown in FIG. 6, the direction in which the first engaging portion 21 deforms at the time when the cover body 12 is assembled to the bumper 16 is set in a direction to enhance engagement between the first engaging portion 21 and the second engaging portion 22. Specifically, the hook 21A of the first engaging portion 21 is formed to protrude in a direction away from the center of the opening 12A of the cover body 12, and the hook 21D is formed to protrude in a direction approaching the center of the opening 12A. By so doing, at the time of assembling the cover body 12 to the bumper 16, when the hook 21A slides over the peripheral portion 16E of the engaging portion 16D of the bumper 16, the first engaging portion 21 deforms toward the center of the opening 12A (in the arrow B direction), and the hook 21D relatively enters deeper in the engaging hole 22C of the second engaging portion 22.

In the above described embodiment, the direction in which the first engaging portion 21 deforms at the time when the cover body 12 is assembled to the bumper 16 is set in a direction to enhance engagement between the first engaging portion 21 and the second engaging portion 22; however, the direction in which the first engaging portion 21 deforms is not limited to this direction. When the cover body 12 to which the cover ring 14 is assembled in advance is assembled to the bumper 16, the direction in which the first engaging portion 21 deforms may be set in any direction as long as engagement between the first engaging portion 21 and the second engaging portion 22 is hard to be released.

In addition, the first engaging portion 21 has the hook 21A that is formed to protrude in a direction away from the opening 12A of the cover body 12; however, the first engaging portion 21 is not limited to this configuration. The first engaging portion 21 may have any structure as long as it is engageable with the bumper 16.

The second engaging portion 22 that engages with the first engaging portion 21 is the one located at the outermost side (the area 32 in FIG. 2) in the vehicle widthwise direction among the plurality of engaging portions 28; however, the second engaging portion 22 is not limited to this configuration. Instead, for example, the second engaging portion 22 may be the one located in the area 30 or 34 in FIG. 2.

What is claimed is:

1. A fog lamp cover mounting structure comprising:
a cover body that is assembled to a mounting portion at which a fog lamp is mounted on a bumper, that has an opening through which the fog lamp appears, and that has a first engaging portion that engages with the bumper; and
a cover ring that is assembled to a peripheral portion of the opening of the cover body, and that has a second engaging portion that engages with the first engaging portion; wherein
the first engaging portion and the second engaging portion each have a hook that is formed to protrude in a direction away from a center of the opening, and
the first engaging portion has an engaging hole that extends therethrough and that engages with the hook of the second engaging portion.

2. The fog lamp cover mounting structure according to claim 1, wherein
a direction in which the first engaging portion deforms at the time when the cover body is assembled to the bumper is set in a direction to enhance engagement between the first engaging portion and the second engaging portion.

3. A fog lamp cover mounting structure comprising:
a cover body that is assembled to a mounting portion at which a fog lamp is mounted on a bumper, that has an opening through which the fog lamp appears, and that has a first engaging portion that engages with the bumper;
a cover ring that is assembled to a peripheral portion of the opening of the cover body, and that has a second engaging portion that engages with the first engaging portion; wherein
the first engaging portion has a first hook that is formed to protrude in a direction away from a center of the opening and a second hook that is formed to protrude in a direction approaching the center of the opening, and
the second engaging portion has an engaging hole that extends therethrough and that engages with the second hook of the first engaging portion.

4. The fog lamp cover mounting structure according to claim 1, wherein
the second engaging portion of the cover ring has an engaging guide portion that guides engagement between the first engaging portion and the second engaging portion.

5. The fog lamp cover mounting structure according to claim 3, wherein
the first engaging portion of the cover body has an engaging guide portion that guides engagement between the first engaging portion and the second engaging portion.

6. The fog lamp cover mounting structure according to claim 4, wherein
the engaging guide portion is an inclined surface that allows the cover ring to be smoothly assembled to the cover body.

7. The fog lamp cover mounting structure according to claim 1, wherein
the cover ring has a plurality of engaging portions, including the second engaging portion, that engage with the cover body, and
the second engaging portion is located at an outermost side in a vehicle widthwise direction among the plurality of engaging portions.

8. The fog lamp cover mounting structure according to claim 1, wherein
the cover body has a plurality of engaging portions, including the first engaging portion, that engage with the bumper, and
the first engaging portion is located at an outermost side in a vehicle widthwise direction and a vehicle lowermost side among the plurality of engaging portions.

9. The fog lamp cover mounting structure according to claim 3, wherein
a direction in which the first engaging portion deforms at the time when the cover body is assembled to the bumper is set in a direction to enhance engagement between the first engaging portion and the second engaging portion.

10. The fog lamp cover mounting structure according to claim 5, wherein
the engaging guide portion is an inclined surface that allows the cover ring to be smoothly assembled to the cover body.

11. The fog lamp cover mounting structure according to claim 3, wherein
the cover ring has a plurality of engaging portions, including the second engaging portion, that engage with the cover body, and
the second engaging portion is located at an outermost side in a vehicle widthwise direction among the plurality of engaging portions.

12. The fog lamp cover mounting structure according to claim 3, wherein
the cover body has a plurality of engaging portions, including the first engaging portion, that engage with the bumper, and
the first engaging portion is located at an outermost side in a vehicle widthwise direction and a vehicle lowermost side among the plurality of engaging portions.

* * * * *